US008319604B2

(12) United States Patent
Weng et al.

(10) Patent No.: US 8,319,604 B2
(45) Date of Patent: Nov. 27, 2012

(54) ELECTRIC RELEASE FASTENING DEVICE FOR THIN-PROFILE SPACE

(76) Inventors: Ping-Hsun Weng, Taichung (TW); Chun-Sung Cheng, Dali (TW); Chih-Lung Peng, Taichung (TW)

( * ) Notice: Subject to any disclaimer, the term of this patent is extended or adjusted under 35 U.S.C. 154(b) by 445 days.

(21) Appl. No.: 12/697,635

(22) Filed: Feb. 1, 2010

(65) Prior Publication Data

US 2011/0187495 A1 Aug. 4, 2011

(51) Int. Cl.
*G05B 19/00* (2006.01)

(52) U.S. Cl. ..................... 340/5.53; 340/5.73; 340/5.52; 292/230; 292/237

(58) Field of Classification Search ........ 340/5.51–5.55, 340/5.8, 5.51–5.85; 292/194, 230, 231, 237, 292/238; 70/275–277, 278.1–278.7, 280–282
See application file for complete search history.

(56) References Cited

U.S. PATENT DOCUMENTS 5,573,050 A * 11/1996 Henkenjohann .............. 160/133
5,626,039 A * 5/1997 Solari et al. .................. 70/279.1
5,701,770 A * 12/1997 Cook et al. ......................... 70/63
6,325,427 B1 * 12/2001 Daoud ............................ 292/27
6,741,160 B1 * 5/2004 Dawson et al. .............. 340/5.55
6,882,269 B2 * 4/2005 Moreno ........................ 340/5.73
7,671,719 B2 * 3/2010 Sogo ............................ 340/5.73
2005/0077995 A1 * 4/2005 Paulsen et al. ................. 340/5.6
2005/0146419 A1 * 7/2005 Porter .......................... 340/5.73
2005/0206499 A1 * 9/2005 Fisher .......................... 340/5.73

* cited by examiner

*Primary Examiner* — Albert Wong
*Assistant Examiner* — Nay Tun
(74) *Attorney, Agent, or Firm* — Egbert Law Offices, PLLC

(57) ABSTRACT

An electric release fastening device for a thin-profile space has a fingerprint identifier, a micro drive motor, a change gear set, an electric controller, an electric battery, a moveable fastening cassette, a fastening cassette control unit and a locking locator. When the fingerprint identifier reads the correct identification information, the micro drive motor is ordered by the electric controller to drive the change gear set, and then change the position of the fastening cassette control unit. This switches the positioning or release state between the moveable fastening cassette and the locking locator, and controls or electrically releases the product cover. With this configuration, the electric release fastening device can be assembled into thin-profile spaces with improved applicability.

6 Claims, 8 Drawing Sheets

ELECTRIC RELEASE FASTENING DEVICE FOR THIN-PROFILE SPACE

CROSS-REFERENCE TO RELATED U.S. APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

The present invention relates generally to a fastening device, and more particularly to an innovative one which is configured into an electric release type mounted into a thin-profile space.

2. Description of Related Art Including Information Disclosed Under 37 CFR 1.97 and 37 CFR 1.98.

The fastening device is widely applied to the "open/close" structure of various products, enabling users to control the positioning or release state of the product enclosure.

A conventional fastening device is generally configured with a mechanical drive control mode, allowing the user to position and release the fastening device via a preset operating mode (e.g.: pressing, pushing and rotating). That is to say, such fastening devices lack a locking function. Yet, the existing fastening device is combined with several types of locking devices such as a number lock. However, such a combined structure has a shortcoming of bigger space, making it difficult to adapt to thin-profile products.

With the development of products towards lightweight and compactness, there is a huge demand for a combined electric fastening device, but an important technical concern is how to develop a thin-profile structure for the applications.

Thus, to overcome the aforementioned problems of the prior art, it would be an advancement if the art to provide an improved structure that can significantly improve the efficacy.

Therefore, the inventor has provided the present invention of practicability after deliberate experimentation and evaluation based on years of experience in the production and development of related products.

BRIEF SUMMARY OF THE INVENTION

The enhanced efficacy of the present invention is as follows:

Based on the unique configuration of the present invention wherein the "electric release fastening device for thin-profile space" mainly comprises a fingerprint identifier, a micro drive motor, a change gear set, an electric controller, an electric battery, a moveable fastening cassette, a fastening cassette control unit and a locking locator, the electric release fastening device can be assembled into thin-profile space for a wider range of applications with improved applicability.

The improvements brought about by this invention are as follows:

Based on the structural configuration wherein the casing is provided with a cover jacking member at exterior of the moveable fastening cassette, the cover can be pushed open under release state, enabling users to open it more easily.

Although the invention has been explained in relation to its preferred embodiment, it is to be understood that many other possible modifications and variations can be made without departing from the spirit and scope of the invention as hereinafter claimed.

DETAILED DESCRIPTION OF THE INVENTION

Figure 1:
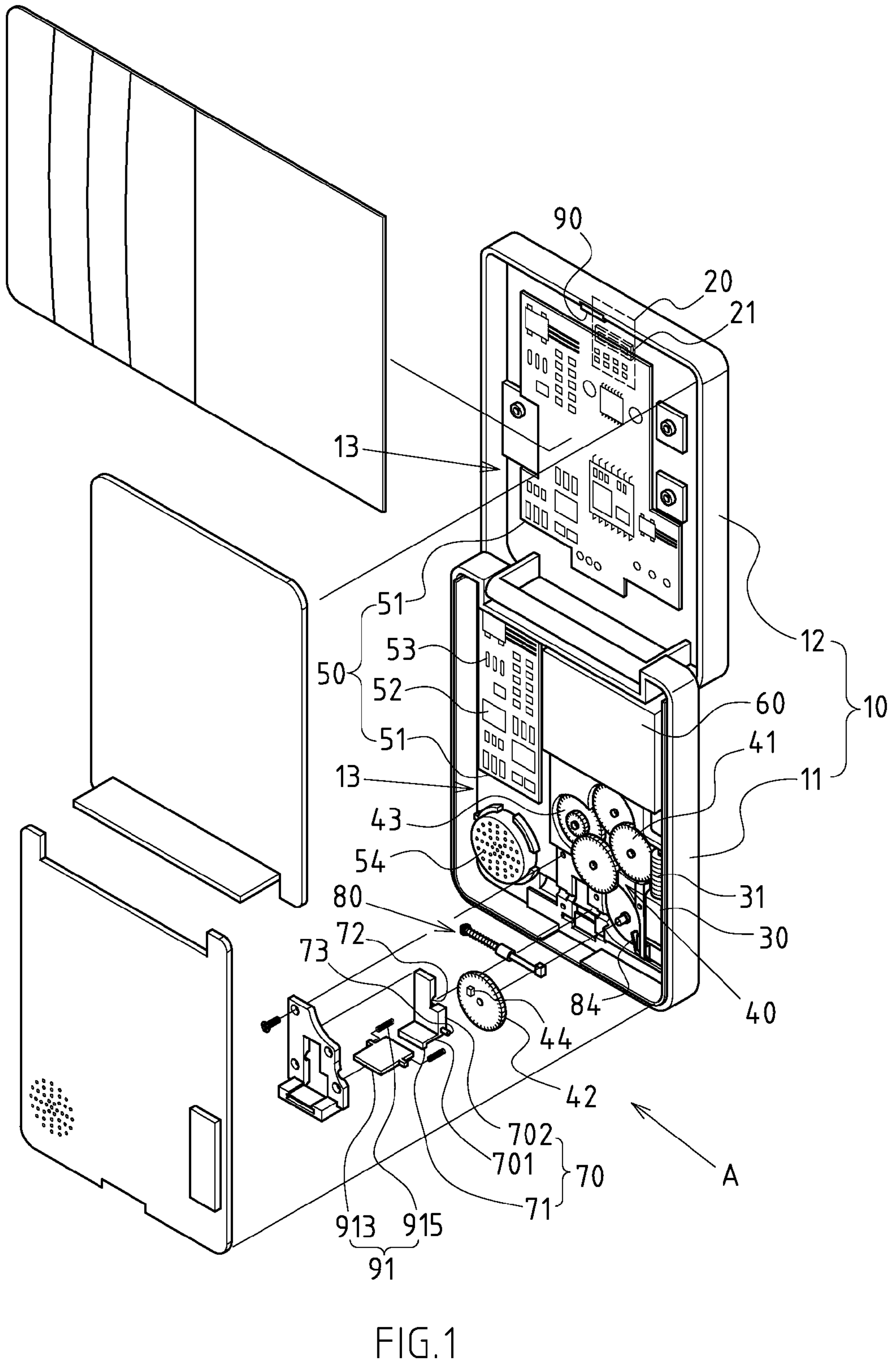
FIG. 1 shows an exploded perspective view of the present invention.
Figure 2:
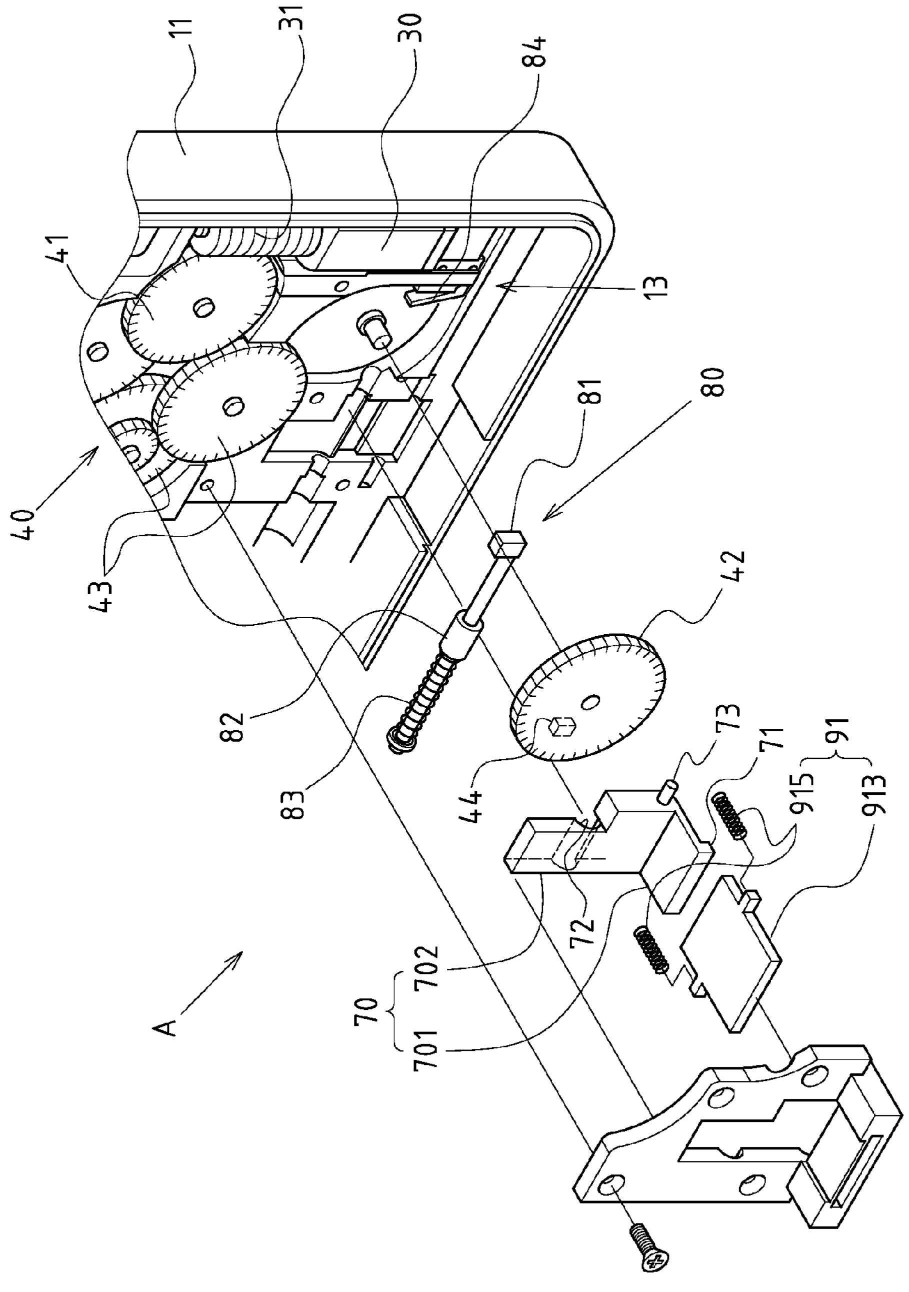
FIG. 2 shows a partially enlarged view of FIG. 1.
Figure 3:
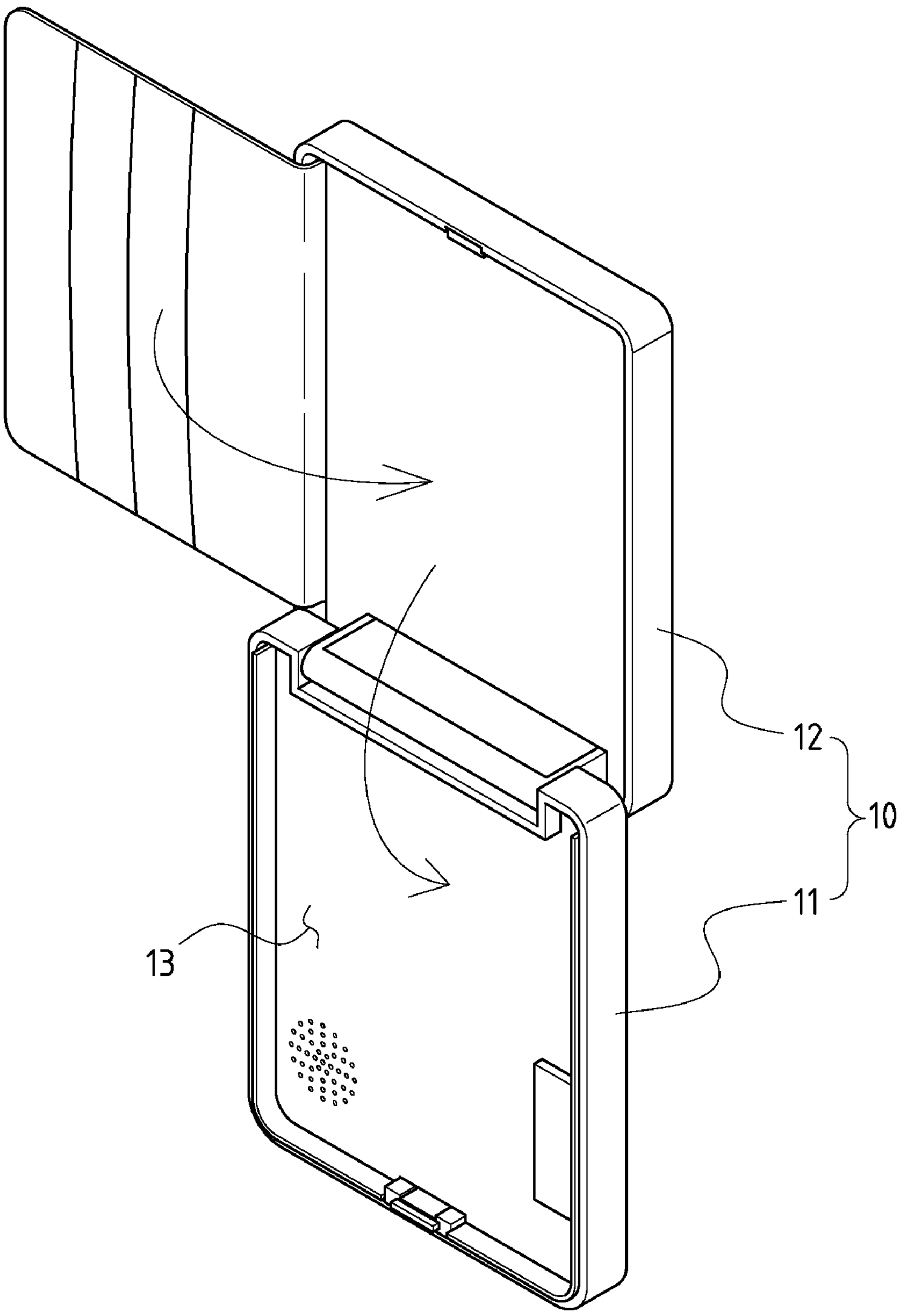
FIG. 3 shows a schematic view wherein the casing and cover are opened under the structural combination of the present invention.
Figure 4:
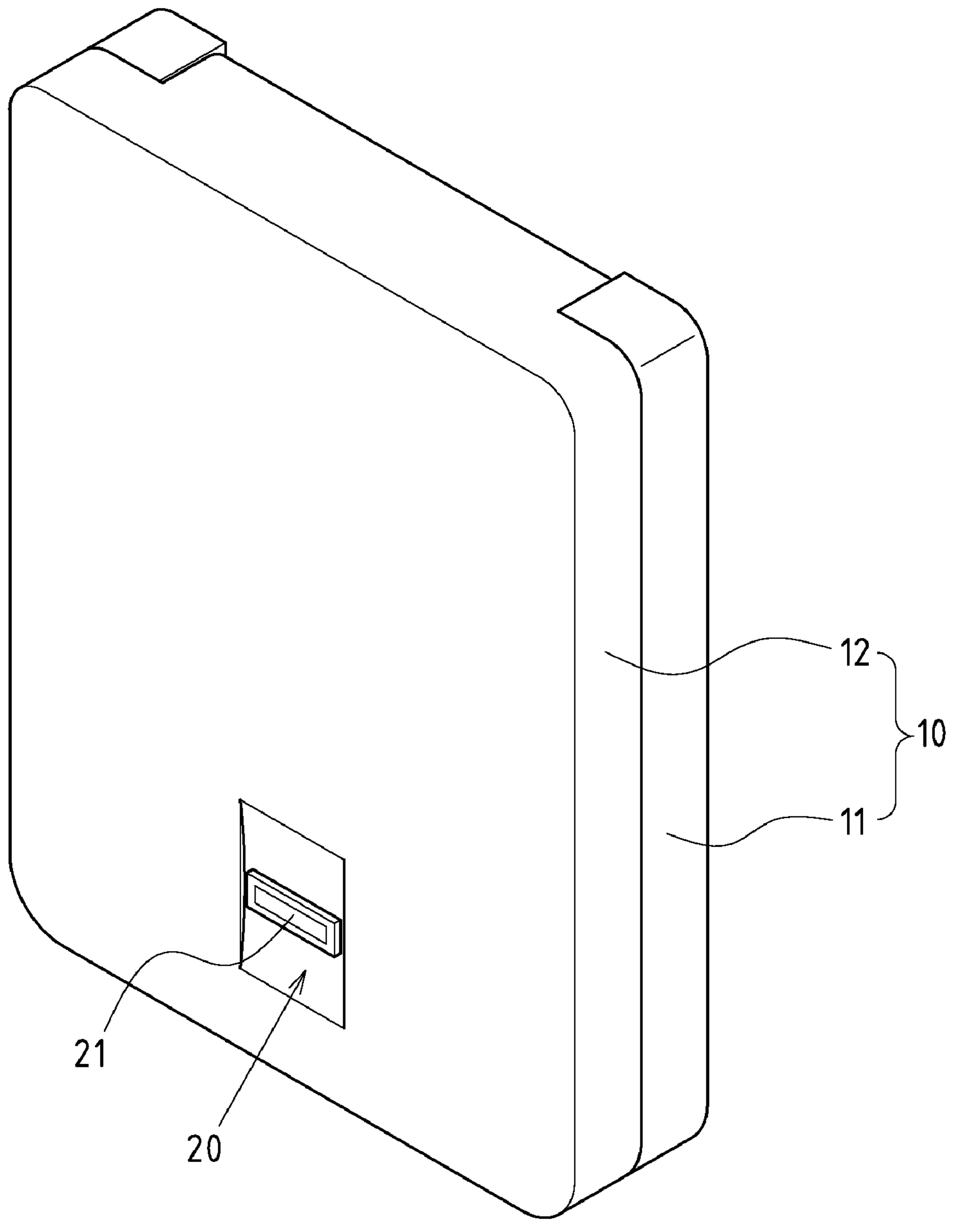
FIG. 4 shows a schematic view wherein the casing and cover are closed under the structural combination of the present invention.

FIGS. 1-4 depict preferred embodiments of an electric release fastening device of the present invention, which are provided for only explanatory objective for patent claims. Said electric release fastening device is mounted into a thin-profile space 13 preset in the casing 11 and cover 12 of a product 10 (a solid purse), and used to control and switch the positioning and release mode of the casing 11 and cover 12. Said electric release fastening device A includes a fingerprint identifier 20, mounted into either of the casing 11 or the cover 12. The fingerprint identifier 20 is provided with an exposed scanner head 21 (shown in FIG. 4).

A micro drive motor 30 is mounted into the thin-profile space 13 as a driving source. The micro drive motor 30 is provided with an output screw 31.

A change gear set 40 is mounted into the thin-profile space 13. The change gear set 40 includes a start gear 41, an end gear 42 and a plurality of change gears 43 defined between the start gear 41 and end gear 42. Of which, the start gear 41 is meshed and driven by the output screw 31 of the micro drive motor 30, and a driving portion 44 is protruded from one side of the end gear 42.

An electric controller 50 is mounted into the thin-profile space 13, which includes a circuit board 51, a processor 52 and an electric control component 53. The electric controller 50 is electrically connected with the fingerprint identifier 20 and the micro drive motor 30, enabling it to control the micro drive motor 30 according to the sensing signal of the fingerprint identifier 20.

An electric battery 60 is mounted into the thin-profile space 13 and electrically connected with the electric controller 50, thus providing electric power to the fingerprint identifier 20, micro drive motor 30 and electric controller 50.

A moveable fastening cassette 70 is mounted onto one side of the casing 11 (or cover 12) in a moveable state. The moveable fastening cassette 70 includes at least one moveable fastening portion 71 and a release control portion 72. The moveable fastening portion 71 is protruded towards the cover 12.

A fastening cassette control unit 80 is mounted between the end gear 42 of the change gear set 40 and the moveable fastening cassette 70 in a moveable state. The fastening cassette control unit 80 includes a driven end 81, a positioning portion 82 and a resetter 83. The driven end 81 can be driven by the driving portion 44 of the end gear 42, while the positioning portion 82 is mated with the release control portion 72 of the moveable fastening cassette 70 to switch the positioning and displacement state of the moveable fastening cassette 70. The resetter 83 enables automatic resetting of the fastening cassette control unit 80.

At least one locking locator 90 is mounted at one side of the cover 12 (or casing 11). The locking locator 90 enables locking of the moveable fastening portion 71 of the moveable fastening cassette 70 so as to locate the closing state of the cover 12 and the casing 11.

Of which, the moveable fastening cassette 70 is configured into a curved plate defining a first plate 701 and a second plate 702. A flanged shaft 73 is set pivotally at both sides of the corner of the curved plate, so that the moveable fastening cassette 70 is in a swinging state. Then, the moveable fastening portion 71 is protruded from the end of the first plate 701, and the release control portion 72 is set at one side of the second plate 702 in a semi-circular groove pattern. The driven end 81 of the fastening cassette control unit 80 is configured into a hooked pattern, the driving portion 44 of the end gear 42 is configured into a bulging pattern, and the positioning portion 82 of the fastening cassette control unit 80 is configured into an expanded cylindrical pattern that is mated with the release control portion 72 of a semi-circular groove pattern. The resetter 83 of the fastening cassette control unit 80 is made of a helical spring.

A power-off sensing switch 84 is arranged in the thin-profile space 13 correspondingly to the driven end 81 of the fastening cassette control unit 80. The power-off sensing switch 84 is electrically connected with the electric controller 50. When the driven end 81 shifts to the preset location, it touches the power-off sensing switch 84 to generate a power-off signal, enabling stop of the micro drive motor 30.

The casing 11 is provided with a cover jacking member 91 exterior of the moveable fastening cassette 70. The cover jacking member 91 includes a moveable top plate 913 and an elastic supporting member 915, of which the moveable top plate 913 can be elastically protruded to push the cover 12 via the elastic supporting member 915.

Of which, a buzzer 54 is mounted into the thin-profile space 13, and electrically connected with the electric controller 50, allowing to send out alarming buzz under setting states. There are available with several setting modes, For example, the fingerprint identifier 20 sends out alarming buzz after sensing failures three times. Alternatively, it can be connected with a shock sensor, permitting it to send out alarming buzz and prevent the malicious behavior of others in the event of violent shock of the product.

The locking locator 90 can be prefabricated (plastic molding) onto the cover 12 (or casing 11). Alternatively, the locking locator 90 made of metal material is buried into the plastic cover 12 (or casing 11).

Figure 5:
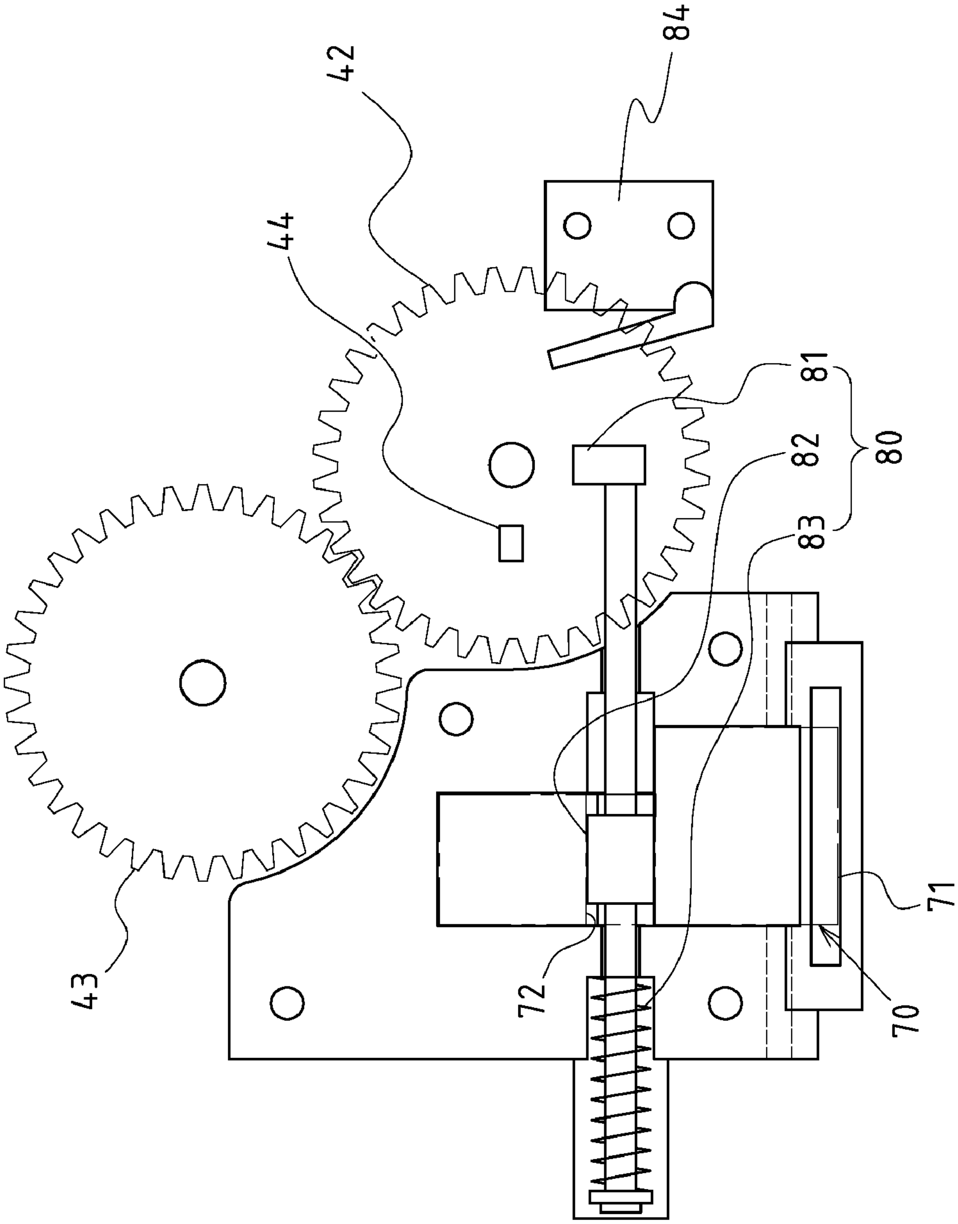
FIG. 5 shows a schematic view of the present invention wherein the fastening cassette control unit is under a positioning state.
Figure 7:
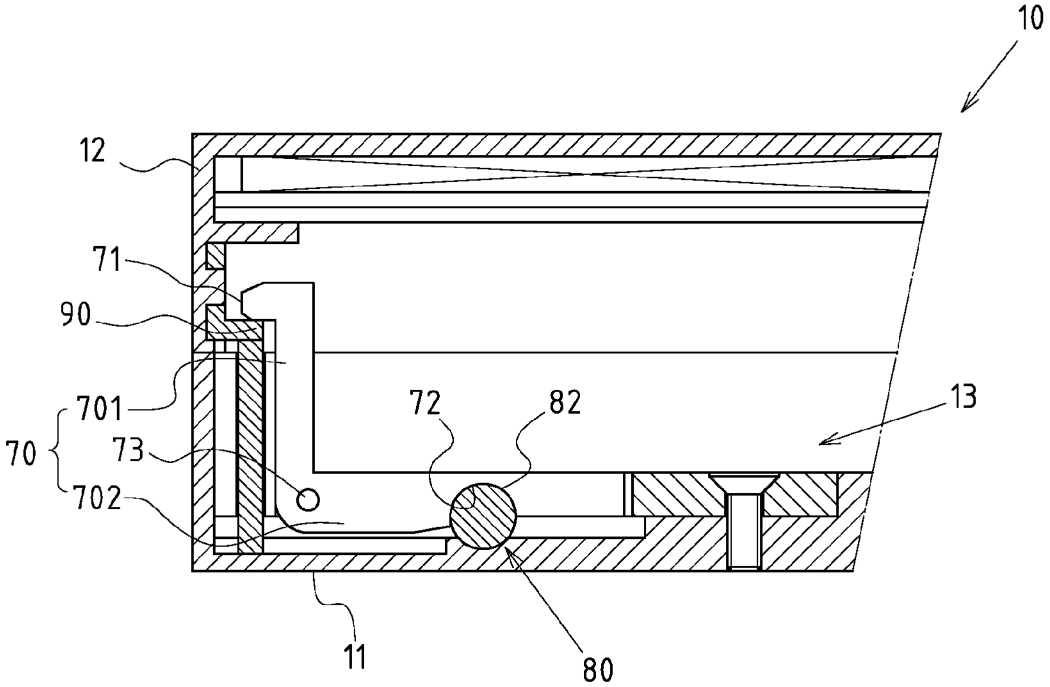
FIG. 7 shows a cross-sectional view of the present invention wherein the fastening cassette control unit is under a positioning state.

Based on the above-specified structural configuration, the present invention is operated as follows:

Referring to FIGS. 5 and 7, a plane view of the present invention is shown wherein the fastening cassette control unit 80 is under a positioning state. In such a case, the fastening cassette control unit 80 is reset leftwards under the elastic support of the resetter 83. Then the positioning portion 82 is aligned to mate with the release control portion 72 of the moveable fastening cassette 70, so that the moveable fastening cassette 70 can be fixed securely, and the moveable fastening portion 71 can be rigidly locked onto the locking locator 90 of the cover 12.

Figure 8:
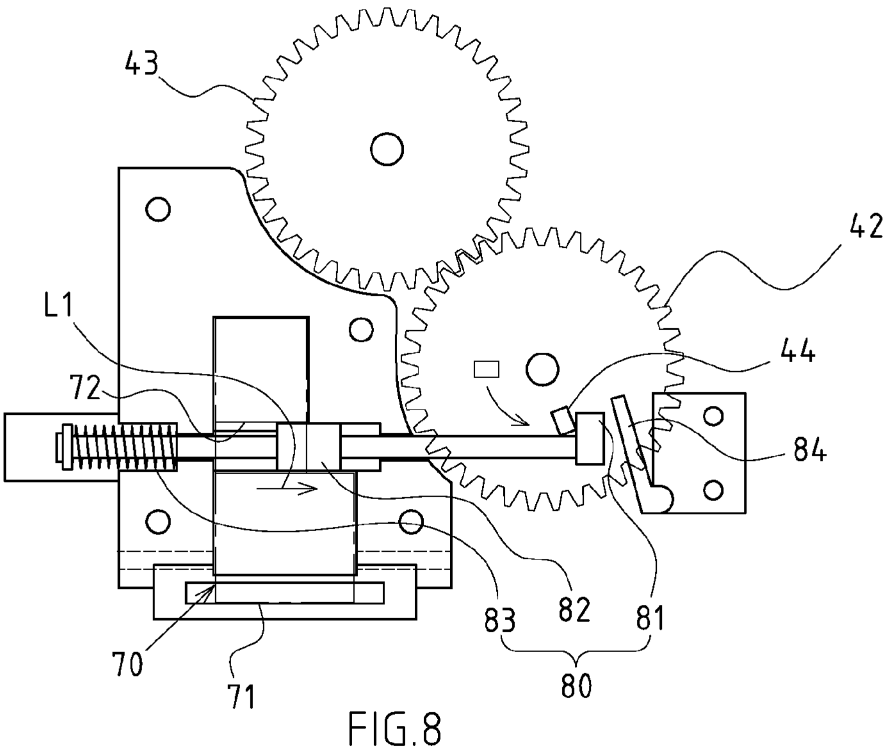
FIG. 8 shows a schematic view of the present invention wherein the fastening cassette control unit is driven by the change gear set.
Figure 9:
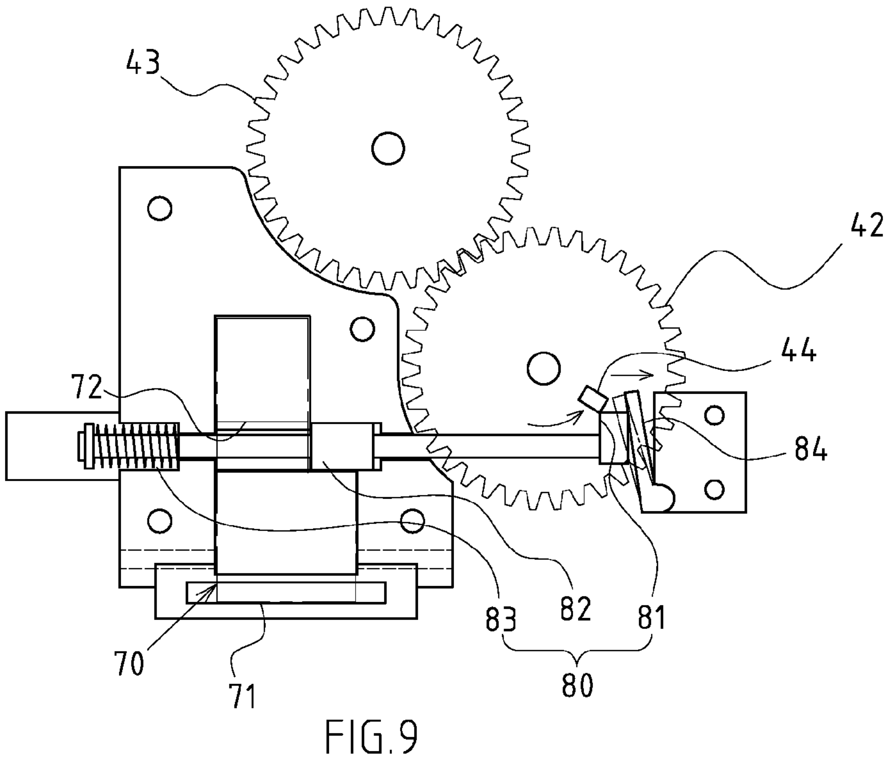
FIG. 9 shows a schematic view of the present invention wherein the fastening cassette control unit is under a release state.
Figure 10:
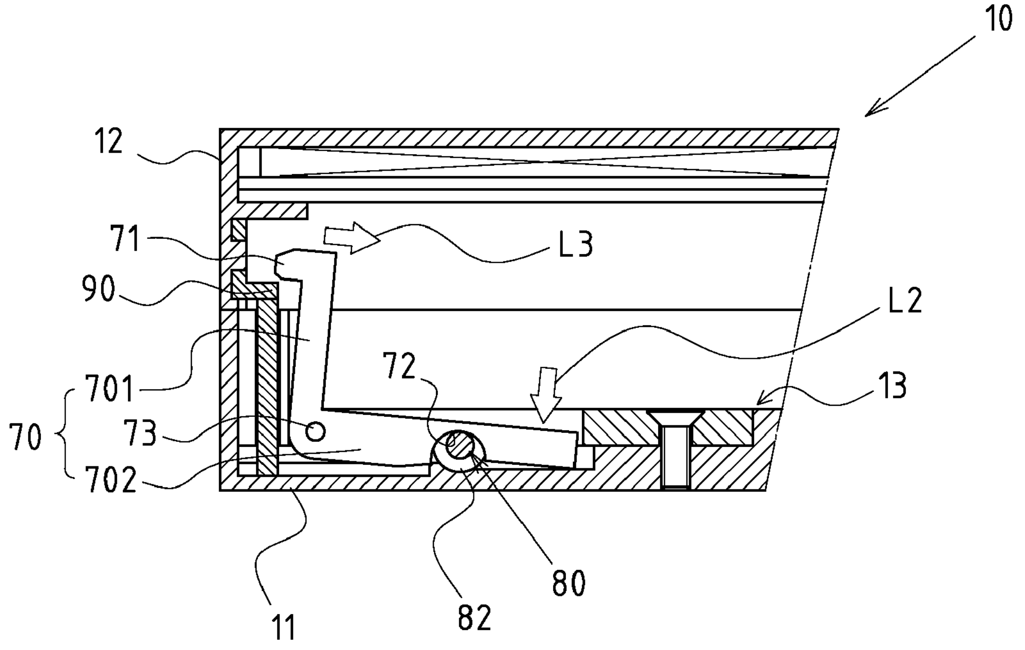
FIG. 10 shows a schematic view of the present invention wherein the moveable fastening cassette is disengaged from the locking locator.

When it is intended to release and open the cover 12, users can press their fingers onto the scanner head 21 of the fingerprint identifier 20 (shown in FIG. 4) for fingerprint scanning. If the fingerprint scanning result matches the default value of the electric controller 50, the electric controller 50 will give an order to start the micro drive motor 30, and then drive the change gear set 40 (shown in FIGS. 1, 2). Referring also to FIGS. 8 and 9, with the rotation of the end gear 42, the protruded driving portion 44 will push the driven end 81 of the fastening cassette control unit 80 during the circumferential displacement, and drive the positioning portion 82 to shift rightwards (shown by arrow L1), so the positioning portion 82 is disengaged from the release control portion 72 of the moveable fastening cassette 70. Referring to FIG. 10, the second plate 702 of the moveable fastening cassette 70 will swing downwards (shown by arrow L2), so the moveable fastening portion 71 at the end of the first plate 701 swings rightwards (shown by arrow L3), and is then disengaged from the locking locator 90 of the cover 12.

Figure 6:
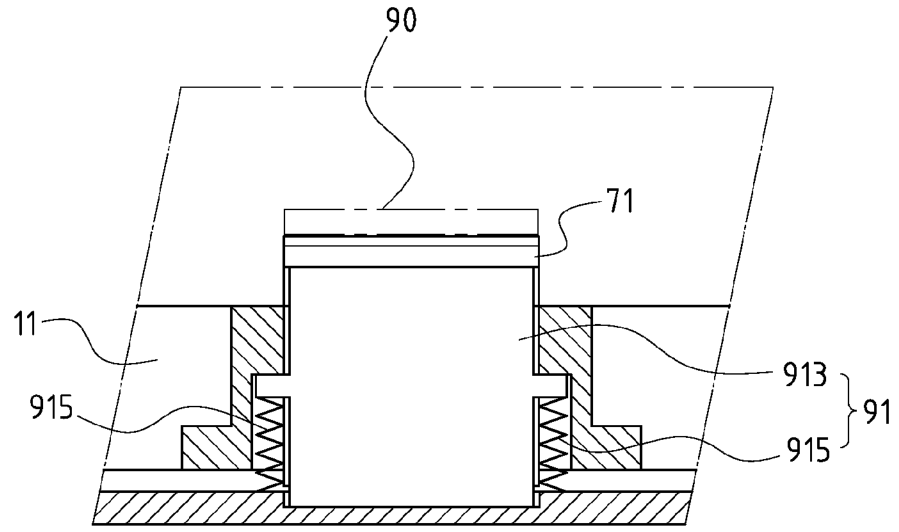
FIG. 6 shows a cross-sectional view of the assembled cover jacking member of the present invention.
Figure 11:
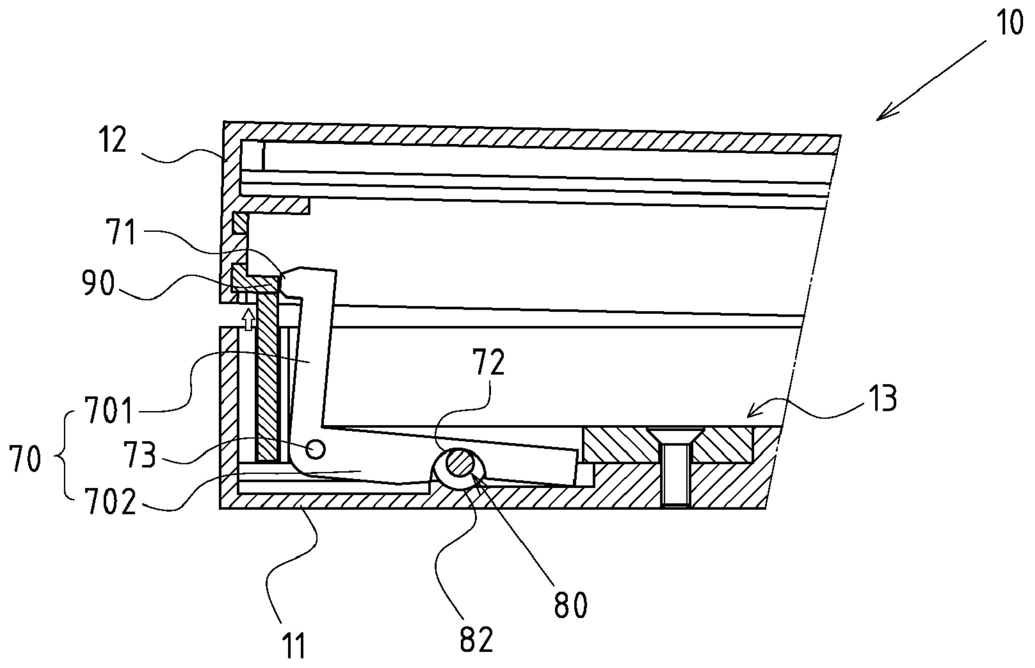
FIG. 11 shows a schematic view of the present invention wherein the cover is supported open by the cover jacking member.

Referring also to FIG. 11, with the disengagement of the moveable fastening portion 71 from the locking locator 90, the moveable top plate 913 of the elastic supporting member 915 is protruded elastically to push the cover 12 with the help of elastic supporting member 915 (shown in FIG. 6). Referring also to FIG. 9, the rotating end gear 42 drives the driving portion 44 to shift to an angular position, so the driven end 81 of the fastening cassette control unit 80 will touch the power-off sensing switch 84, and gives an order to stop the micro drive motor 30 via the electric controller 50. Of which, when the power-off sensing switch 84 is touched by the driven end 81 of the fastening cassette control unit 80, the micro drive motor 30 is not stopped immediately, but postponed through the setting of the electric controller 50. This aims to maintain continuous operation of the change gear set 40, such that the driving portion 44 of the end gear 42 can shift to the preset location for the driven end 81 of the fastening cassette control unit 80 (shown in FIG. 8), helping to facilitate next release.

Additionally, the moveable fastening portion 71 of the moveable fastening cassette 70 and the locking locator 90 are interlocked in one or two groups (two locations) for the same locking efficiency. It should be appreciated that the present invention is capable of various modifications by those skilled in the art. Besides, the moveable top plate 913 of said cover jacking member 91 can be configured into either one or two groups, which can help to push open the cover in the same way.

We claim:

1. An electric release fastening apparatus comprising:

a casing having a thin-profile space therein;

a cover connected to said casing, said cover extending over said casing in one position;

a fingerprint identifier mounted to at least one of said casing and said cover, said fingerprint identifier having a scanner head exposed on a surface of the cover or the casing;

a micro drive motor mounted in said thin-profile space, said micro drive motor having an output screw;

a change gear set mounted in said thin-profile space, said change gear set having a start gear and an end gear and a plurality of change gears cooperative between said start gear and said end gear, said start gear being meshed with and driven by said output screw of said micro drive motor, said end gear having a driving portion protruding from one side thereof;

an electric controller mounted in said thin-profile space, said electric-controller having a circuit board and a processor and an electric control component, said fingerprint identifier and said micro drive motor electrically connected to said electric controller so as to actuate said micro drive motor as a result of a signal received from said fingerprint identifier;

a battery mounted in said thin-profile space and electrically connected to said electric controller so as to provide power to said fingerprint identifier and to said micro drive motor to said electric controller;

a movable fastening cassette mounted to a side of one of said casing and said cover, said movable fastening cassette having a movable fastening portion and a release control portion, said movable fastening portion extending toward the other of said casing and said cover, said movable fastening cassette being a plate having a first portion and a second portion, said movable fastening cassette having a shaft positioned at a corner of said plate, said movable fastening portion extending from an end of said first portion of said plate, said second portion of said plate having a semi-circular groove formed therein so as to define said release control portion;

a fastening cassette control unit movably mounted between said end gear and said movable fastening cassette, said fastening cassette control unit having a driven end and a positioning portion and a resetter, said driven end being driven by said driving portion of said end gear, said positioning portion being mated with said semi-circular groove so as to switch a positioning and a displacement of said movable fastening cassette, said resetter suitable for automatically resetting the position of said fastening cassette control unit, said driven end of said fastening cassette control unit having a hook shape, said positioning portion of said fastening cassette control unit having a cylindrical shape that is mated with said semi-circular groove, said resetter being a helical spring; and at least one locking locator mounted at a side of one of said casing or said cover and cooperative with said movable fastening portion of said movable fastening cassette so as to lock said movable fastening cassette in said one position.

2. The electric release fastening apparatus of claim 1, further comprising:

a power-off sensing switch positioned in said thin-profile space adjacent to said driven end of said fastening cassette control unit, said power-off sensing switch electrically connected to said electric controller so as to generate a power-off signal to stop said micro drive motor when said driven end reaches a desired position.

3. The electric release fastening apparatus of claim 1, said casing having a cover jacking member at an exterior of said movable fastening cassette, said cover jacking member having a movable top plate and an elastic supporting member, said movable top plate being urged by said elastic supporting member so as to push said cover.

4. The electric release fastening apparatus of claim 1, further comprising:

a buzzer mounted in said thin-profile space, said buzzer being electrically connected to said electric controller.

5. The electric release fastening apparatus of claim 1, the locking locator being prefabricated onto one of said cover and said casing.

6. The electric release fastening apparatus of claim 1, the locking locator being formed of a metallic material that is buried into one of said cover and said casing.

* * * * *